(12) United States Patent
Wideman et al.

(10) Patent No.: US 6,797,757 B2
(45) Date of Patent: Sep. 28, 2004

(54) ARTICLE, INCLUDING TIRES, HAVING COMPONENT OR RUBBER COMPOSITION WHICH CONTAINS PARTICLES OF PRE-VULCANIZED RUBBER AND BLEND OF TETRATHIODIPROPIONIC AND TRITHIODIPROPIONIC ACIDS

(75) Inventors: Lawson Gibson Wideman, Hudson, OH (US); George Frank Balogh, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 168 days.

(21) Appl. No.: 10/141,306

(22) Filed: May 8, 2002

(65) Prior Publication Data

US 2003/0004243 A1 Jan. 2, 2003

Related U.S. Application Data

(60) Provisional application No. 60/302,177, filed on Jun. 29, 2001.

(51) Int. Cl.$^7$ .............................................. C08K 5/36
(52) U.S. Cl. ...................... 524/303; 521/43; 521/43.5; 523/215; 524/295; 524/302; 524/526; 525/332.6
(58) Field of Search ................................ 524/295, 303, 524/526, 302; 523/215; 525/332.6; 521/43, 43.5

(56) References Cited

U.S. PATENT DOCUMENTS

| | | | |
|---|---|---|---|
| 5,130,363 A | 7/1992 | School et al. | 524/392 |
| 5,733,963 A | 3/1998 | Sandstrom et al. | 524/492 |
| 5,883,139 A | 3/1999 | Wideman et al. | 521/43.5 |
| 6,660,791 B2 * | 12/2003 | Wideman et al. | 524/303 |

FOREIGN PATENT DOCUMENTS

| | | | |
|---|---|---|---|
| EP | 0488931 | 6/1992 | C08K/5/34 |
| EP | 0780429 | 6/1997 | C08K/5/372 |
| EP | 1031440 | 8/2000 | B60C/1/00 |
| JP | 09-176381 | * 7/1997 | |

OTHER PUBLICATIONS

European Search Report.

* cited by examiner

*Primary Examiner*—Edward J. Cain
(74) *Attorney, Agent, or Firm*—Henry C. Young, Jr.

(57) ABSTRACT

The invention relates to articles of manufacture, such as for example, tires and industrial products, which have at least one component comprised of a rubber composition which contains particles of pre-sulfur vulcanized rubber (e.g. ground recycled rubber) and impure tetrathiodipropionic acid, namely a blend comprised primarily of tetrathiodipropionic acid and trithiodipropionic acids of a weight ratio thereof in a range of about 80/20 to about 30/70. Said blend is referred to herein as an S4/S3 blend. The S4/S3 blend may be introduced directly to a rubber composition or may be provided as particles of a composite of said S4/S3 and a particulate support therefor for a purpose of aiding the dispersion of the S4 and S3 within the elastomer host. Representative of such support, or carrier, may be, for example, silica, particularly amorphous precipitated silica, carbon black, clay, starch, calcium carbonate, calcium silicate, titanium dioxide and the like, wherein carbon black is preferred. It is considered herein that an advantageous nature of the invention is to provide such an S4/S3 blend, for example, in a manner to somewhat depress the melting point of the trithiodipropionic acid and therefore promote its processability and incorporation with particles of pre-vulcanized rubber without substantially degrading any beneficial effect thereof. Thus, the invention is intended to be exclusive of use of 100 percent pure tetrathiodipropionic acid and exclusive of relatively high purity trithiodipropionic acid which contains at least 80 percent trithiodipropionic acid.

19 Claims, No Drawings

ARTICLE, INCLUDING TIRES, HAVING COMPONENT OR RUBBER COMPOSITION WHICH CONTAINS PARTICLES OF PRE-VULCANIZED RUBBER AND BLEND OF TETRATHIODIPROPIONIC AND TRITHIODIPROPIONIC ACIDS

This application claims the benefit of U.S. Provisional Application Ser. No. 60/302,177, filed on Jun. 29, 2001.

FIELD OF THE INVENTION

The invention relates to articles of manufacture, such as for example, tires and industrial products, which have at least one component comprised of a rubber composition which contains particles of pre-sulfur vulcanized rubber (e.g. ground recycled rubber) and impure tetrathiodipropionic acid, namely a blend comprised primarily of tetrathiodipropionic acid and trithiodipropionic acids of a weight ratio thereof in a range of about 80/20 to about 30/70. Said blend is referred to herein as an S4/S3 blend. The S4/S3 blend may be introduced directly to a rubber composition or may be provided as particles of a composite of said S4/S3 blend and a particulate support therefor for a purpose of aiding the dispersion of the S4 and S3 within the elastomer host. Representative of such support, or carrier, may be, for example, silica, particularly amorphous precipitated silica, carbon black, clay, starch, calcium carbonate, calcium silicate, titanium dioxide and the like, wherein carbon black is preferred. It is considered herein that an advantageous nature of the invention is to provide such an S4/S3 blend, for example, in a manner to somewhat depress the melting point of the trithiodipropionic acid and therefore promote its processability and incorporation with particles of pre-vulcanized rubber without substantially degrading any beneficial effect thereof. Thus, the invention is intended to be exclusive of use of 100 percent pure tetrathiodipropionic acid and exclusive of relatively high purity trithiodipropionic acid which contains at least 80 percent trithiodipropionic acid.

BACKGROUND OF THE INVENTION

Tetrathiodipropionic acid has been suggested for use in treating sulfur pre-vulcanized scrap rubber which has been ground to a fine particle size for a purpose of recycling such rubber in its vulcanized form by blending such particles with unvulcanized elastomers to form a rubber composition which may be fabricated into various articles of manufacture. For example, see U.S. Pat. No. 5,883,139.

Generally, such particulate recycled sulfur pre-vulcanized rubber is a complex mixture of largely unknown diene-based elastomers and various rubber compounding ingredients, and may contain a small quantity of textile fiber, and the like.

It has been observed that, after adding sulfur and accelerator to recycled sulfur pre-vulcanized rubber, followed by its revulcanization, the resulting physical properties, such as tensile and elongation, are usually lower than the corresponding properties of the original vulcanized rubber from which it was derived.

A process, for example, of improving properties of ground recycled sulfur vulcanized rubber is disclosed in said U.S. Pat. No. 5,883,139 which teaches the use of tetrathiodipropionic acid (referred to herein as S4) to improve properties of rubber compositions which contain particles of ground recycle, sulfur cured diene-based rubber while the use of dithiodipropionic acid (S2) is not considered herein to improve the properties of rubber compositions which contain particles of ground recycle, sulfur cured diene-based rubber in a manner similar to the use of the S4 and is therefore more as a diluent for the rubber composition.

In the description of this invention, the term "phr" relates to parts by weight in a rubber composition of an ingredient therein per 100 parts of elastomer. The terms "rubber" and "elastomer" may be used interchangeably unless otherwise indicated. The terms "rubber composition" and "compound" may be use interchangeably unless otherwise indicated. The terms "vulcanize" and "cure" may also be used interchangeably unless otherwise indicated.

SUMMARY OF THE INVENTION

The present invention relates to a process for improving the properties of ground recycled sulfur-vulcanized rubber and particularly improving sulfur curable diene-based rubber compositions which contain particulate pre-sulfur vulcanized diene-based rubber.

DETAILED DESCRIPTION OF THE INVENTION

In accordance with this invention, a process of preparing sulfur vulcanizable rubber composition which comprises:
(A) preparing a pre-blend by homogeneously blending
  (1) particles of a sulfur vulcanized, diene-based rubber composition, together with
  (2) a blend of tetrathiodipropionic acid and trithiodipropionic acid in a weight ratio thereof in a range of from about 80/20 to about 30/70, alternately in a range of from about 80/20 to about 35/65, and particles of carbon black; or
  (3) particles of a composite comprised of tetrathiodipropionic acid and trithiodipropionic acid in a weight ratio thereof in a range of from about 80/20 to about 30/70, alternately in a range of from about 80/20 to about 35/65, having a weight ratio of said polythiodipropionic acids and a particulate support selected from at least one of carbon black, precipitated silica, starch, clay, calcium carbonate, calcium silicate and titanium dioxide, preferably carbon black, in a range of from about 1/10 to about 10/1;
wherein said polythiodipropionic acids have the general Formula (I):

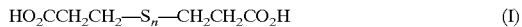

$$HO_2CCH_2CH_2-S_n-CH_2CH_2CO_2H \qquad (I)$$

wherein n is a value of from 4 for said tetrathiodipropionic acid and a value of 3 for said trithiodipropionic acid,
wherein about 0.18 to about 10, alternately from 1 to about 5, parts by weight of said polythiodipropionic acids are provided per 100 parts by weight of diene-based rubber contained in said sulfur vulcanizable rubber composition, and wherein said particles of sulfur vulcanized rubber composition is of a particle size of less than 420 microns;
(B) mixing about one to about 40, alternately about 15 to about 20, parts by weight of said pre-blend with 100 parts by weight of at least one unvulcanized hydrocarbon diene-based, sulfur vulcanizable rubber to form a rubber composition comprised of said unvulcanized rubber and said pre-blend.

Accordingly, in practice, said blend of tetrathiodipropionic acid and trithiodipropionic acid may be added directly to the particulate pre-vulcanized rubber or as said carbon black composite.

In further accordance with this invention, a rubber composition is provided which is comprised of said pre-blend and said unvulcanized rubber.

In additional accordance with this invention, sulfur (referred to herein as free sulfur) is blended with said rubber composition in an amount in a range of about 1 to about 5 parts by weight thereof per 100 parts by weight of said unvulcanized diene-based rubber (usually together with conventional sulfur cure accelerators and other conventional rubber compounding ingredients in conventional amounts) to form a free sulfur-containing rubber composition.

In further accordance with this invention, said free sulfur-containing rubber composition is sulfur vulcanized in a suitable mold under conditions of elevated temperature (e.g. in a range of about 140° C. to about 180° C.) and pressure to form a sulfur vulcanized article of manufacture.

In further accordance with this invention a sulfur vulcanized, pre-vulcanized rubber-containing, rubber composition is provided.

In additional accordance with this invention, an article of manufacture is provided which contains at least one component of a said sulfur vulcanized, pre-vulcanized rubber-containing, rubber composition.

In further accordance with this invention, a tire is provided which contains at least one component of a rubber composition comprised of said sulfur vulcanized, pre-vulcanized rubber-containing, rubber composition.

In additional accordance with this invention, a tire is provided having a tread of a rubber composition which is comprised of said sulfur vulcanized, pre-vulcanized rubber-containing, rubber composition.

It is considered herein to be significant that a trithiodipropionic acid (S3) is substantially diluted with a tetrathiodipropionic (S4) acid in a manner that a melting of one of the polythiodipropionic acids is lowered somewhat to thereby promote a processing of the blend with the particulate pre-vulcanized rubber at the associated elevated rubber mixing temperature be using similar polythiodipropionic acids but without using any appreciable amount of dithiodipropionic acid (S2) which is considered herein to be ineffective insofar as treating the pre-vulcanized rubber particles is concerned and thereby more in a nature as a diluent material in the blend of tetrathiodipropionic acid (S4) and trithiodipropionic acid (S3).

The trithiodipropionic acid may be prepared or obtained, for example, by reacting sulfur dichloride ($SCl_2$) of technical grade purity (ca at least 80 percent) to react with 3-mercaptopropionic acid in toluene solution in a suitable container with coolant being applied to the exterior of the container while the reaction proceeds.

In practice, it is preferred that the said blend of polythiodipropionic acids contain less than, or maximum of, 10 weight percent dithiopropionic acid in the polythiodipropionic acid mixture.

In practice, as hereinbefore related, said particulate, sulfur pre-vulcanized rubber composition should have a maximum particle size of about 420 microns in diameter. It is considered herein that particles greater than such size are of a size which is believed to be relatively impractical for subsequent mixing with the treated vulcanized rubber/unvulcanized rubber because of an expected rubber viscosity build up in rubber processing equipment. In general, it is considered herein that the sulfur pre-vulcanized rubber particles should more preferably have a maximum particle size of about 250 microns (60 mesh) and even more preferably less than about 177 microns (80 mesh). Preferably, such particles range from about 250 microns down to about 74 microns in diameter.

The use of the S4/S3 blend alone or particularly as a component of the pre-formed carbon black composite is considered herein to be beneficial by providing the S4/S3 blend as being bound in a highly dispersed form on the carbon black and to thereby enhance a relatively strong and efficient interaction with the particulate, sulfur-vulcanized rubber with which it is blended.

Use of a composite blending procedure (forming a composite of carbon black and S4/S3 blend) with the recycle sulfur pre-vulcanized rubber is considered herein to be particularly advantageous as an alternative to use of a volatile organic solvent carrier for the S4/S3 blend for other various reasons, such as, for example, safety and environmental considerations.

Representative of various particulate carbon blacks for preparation of said carbon black composite are, for example, conventional rubber reinforcing carbon blacks with ASTM numbered designations ranging from N110 to N991 which can be readily referenced, for example, in the 1990, 13th edition, of *The Vanderbilt Rubber Handbook*, Pages 417 and 418.

The composite of carbon black and S4/S3 blend may be suitably prepared, for example, by highly dispersing the S4/S3 blend onto the surface of the carbon black to thereby maximize the interaction of the S4 and S3 with the surface of the carbon black.

The dispersing of the S4/S3 blend onto the carbon black surface may be accomplished by, for example, by use of a volatile organic solvent which can readily be removed by evaporation, or by spraying or atomizing the S4/S3 blend onto the surface of the carbon black.

In the practice of this invention, the S3/S4 blend alone or as a carbon black composite is dispersed in the particulate sulfur pre-vulcanized rubber in a manner that the S4 and S3 are dispersed in the pre-vulcanized rubber in an amount ranging from 0.18 to 10.0 phr of such polythiodipropionic acids. Preferably, the level of said polythiodipropionic acid blend is dispersed therein ranges from 0.36 to 5.0 phr, based upon the pre-vulcanized rubber.

For the purpose of the description of this invention, the particulate sulfur pre-vulcanized rubber having been treated, or blended, with the composite of the dispersed S4/S3 blend on carbon black may sometimes be referred to herein as "treated sulfur-vulcanized rubber" or "treated recycled vulcanized rubber".

In the practice of this invention, the blend of particles of carbon black composite sulfur pre-vulcanized rubber may be mixed with unvulcanized rubber, particularly unvulcanized diene-based elastomers. For such practice, as hereinbefore from about one to about 40 parts by weight of said particulate blend may be mixed with 100 parts by weight of at least one unvulcanized rubber to form the resulting rubber composition. Preferably, from 2 to 30 parts by weight of said particulate blend is mixed with 100 parts by weight of at least one unvulcanized rubber.

Representative examples of such unvulcanized rubber, or elastomer, are, for example, diene-based elastomers as homopolymers and copolymers of conjugated diene hydrocarbons such as, for example isoprene and 1,3-butadiene and copolymers of conjugated diene hydrocarbons with an aromatic vinyl compound such as styrene and alphamethhyl styrene, preferably styrene.

Representative of such elastomers are, for example, cis 1,4-polyisoprene (natural and synthetic), 1,4-cis-polybutadiene, butadiene/styrene copolymers, isoprene/butadiene copolymers, styrene/isoprene/butadiene terpolymers, and mixtures thereof.

In one aspect at least two unvulcanized elastomers may be blended with said particles of pre-vulcanized rubber. Such elastomers may be, for example, a combination of cis 1,4-polyisoprene rubber (natural or synthetic, with natural rubber being preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

As can be appreciated by one skilled in the art, any of the above recited unvulcanized rubbers may be the same kind or different kind of rubber that is found in the ground recycled rubber.

It is to be appreciated that, in order to cure the rubber composition of the present invention, a sulfur vulcanizing agent is used. Examples of various sulfur vulcanizing agents include, for example, elemental sulfur (free sulfur) or sulfur donating vulcanizing agents, for example, an amine disulfide, polymeric polysulfide or sulfur olefin adducts. Preferably, the sulfur vulcanizing agent is elemental sulfur. The amount of sulfur vulcanizing agent will vary depending on the type of rubber and the particular type of sulfur vulcanizing agent that is used. Generally speaking, the amount of sulfur vulcanizing agent ranges from about 0.1 to about 5 phr with a range of from about 0.5 to about 2 being preferred.

Conventional rubber additives may be incorporated in the rubber stock of the present invention. The additives commonly used in rubber stocks include fillers, plasticizers, waxes, processing oils, peptizers, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representative carbon blacks that are commonly used in rubber stocks include, for example, those with ASTM designations of N110, N121, N220, N231, N234, N242, N293, N299, S315, N326, N330, M332, N339, N343, N347, N351, N358, N375, N472, N539, N582, N630, N642, N660, N754, N762, N765, N774, N990 and N991. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Typical peptizers may be, for example, pentachlorothiophenol and dibenzamidophenyl disulfide. Such peptizers are used in amounts ranging from 0.1 to 1 phr. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, tall oil fatty acids, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate, disulfide or thiuram compound.

The rubber compounds of the present invention may also contain a cure activator. A representative cure activator is methyl trialkyl (C8–C10) ammonium chloride commercially available under the trademark Adogen® 464 from Sherex Chemical Company of Dublin, Ohio. The amount of activator may be used in a range of from 0.05 to 5 phr.

Siliceous pigments may be used in the rubber compound applications of the present invention, including pyrogenic and precipitated siliceous pigments (silica), although precipitated silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930). The silica may also be typically characterized by having a dibutyl phthalate (DBP) absorption value in a range of about 100 to about 400, and more usually about 150 to about 300 $cm^3/100$ g.

Various commercially available silicas may be considered for use in this invention such as, only for example herein, and without limitation, silicas commercially available from PPG Industries under the Hi-Sil trademark with designations 210, 243, etc; silicas available from Rhodia, with, for example, designations of Zeosil 1165MP and Zeosil 165GR and silicas available from Degussa AG with, for example, designations VN2 and VN3, 3370 etc. Generally speaking, the amount of silica may range from 5 to 120 phr and may, if desired, range from a high value of about 50 to about 90 phr or a relatively low value of about 10 to about 30 phr.

A class of compounding materials known as scorch retarders are often used. For example, phthalic anhydride, salicylic acid, sodium acetate and N-cyclohexyl thiophthalimide are known retarders. Retarders, if used, are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, polymerized trimethyldihydroquinoline and mixtures thereof. Specific examples of such anti-degradants are disclosed in *The Vanderbilt Rubber Handbook* (1990), Pages 282 through 286. Antidegradants are generally used in amounts from about 0.25 to about 5.0 phr with a range of from about 1.0 to about 3.0 phr being preferred.

The rubber compound of the present invention may be used, for example, as a wire coat or bead coat for use in a tire. For such purposes, cobalt compounds known in the art to promote the adhesion of rubber to metal may be blended with the rubber composition. Thus, suitable cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate, cobalt neodecanoate, cobalt carboxylate and an organo-cobalt-boron complex commercially available under the designation Manobond C from Wyrough and Loser, Inc., Trenton, N.J.

Amounts of cobalt compound which may be employed depend upon the specific nature of the cobalt compound selected, particularly the amount of cobalt metal present in the compound. Since the amount of cobalt metal varies considerably in cobalt compounds which are suitable for use, it is most appropriate and convenient to base the amount of the cobalt compound utilized on the amount of cobalt metal desired in the finished stock composition.

The amount of the cobalt compound may range from about 0.1 to 2.0 phr. Preferably, the amount of cobalt compound may range from about 0.5 to 1.0 phr. When used, the amount of cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The sulfur vulcanizable rubber compound is conventionally cured at a temperature ranging, for example, from about 140° C. to 180° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

Various articles of manufacture, including tires and industrial products, may contain at least one component comprised of a rubber composition of this invention. For example, the rubber composition of this invention may be used in forming a composite with reinforcing material such as in the manufacture of tires, belts or hoses. Preferably, the composition of the present invention is in the form of a tire and more specially as a component of a tire, including, for example, one or more of the tire's tread, wirecoat, beadcoat, sidewall, apex, chafer and plycoat.

The following Examples are presented to further illustrate, although they are not intended to be limiting. The parts and percentages are by weight unless otherwise indicated.

EXAMPLE I

A particulate carbon black composite composed of carbon black and S4/S3 blend may be prepared as follows:

To a one liter reactor is added 50 grams of a blend of tetrathiodipropionic acid (having a melting point of about 130° C.) and trithiodipropionic acid (having a melting point of about 150+° C.), in a weight ratio of about 50/50 wherein the blend has a melting point of about 135° C. according to capillary tube melting point determination at a heating rate of about 5° C. per minute, together with about 50 milliliters of reagent grade acetone, followed by an addition of 50 grams of particulate N330 carbon black. The mixture is stirred for several minutes and the acetone then removed from the reactor by evaporation under sub-atmospheric pressure at about 23° C., or room temperature. The mixture may be further dried in a vacuum oven at about 50° C. under a vacuum of about 29 inches of mercury for about 4 hours to yield a particulate carbon black composite of the S4/S3 blend and carbon black anticipated to be in a form of free-flowing granules.

EXAMPLE II

A rubber composition is prepared which contains 70 parts by weight of cis 1,4-polybutadiene rubber and 30 parts by weight styrene/butadiene rubber. The rubber composition contains conventional amounts of rubber processing oil, peptizer, fatty acids, antidegradants, waxes, zinc oxide, primary vulcanization accelerator and sulfur.

The rubber composition is prepared in a two-stage internal rubber mixing procedure, namely, by mixing the ingredients in an internal rubber mixer to a temperature of about 150° C., removing and cooling the mixture to below 40° C. and then, as a second mixing stage, mixing the sulfur and sulfur vulcanization accelerator therewith in an internal rubber mixture to a temperature of about 108° C.

Particles of the composite of carbon black and S4/S3 blend prepared in Example I are mixed with rubber composition during said first mixing stage in an amount of about two phr thereof.

Particles of a sulfur pre-vulcanized rubber composition of a size less than 420 microns are also mixed with the rubber composition during said first mixing stage in an amount of 20 phr.

The resulting rubber composition is sulfur cured in a suitable mold at a temperature of about 150° C.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a sulfur vulcanizable rubber composition which comprises:
   (A) preparing a particulate pre-blend by homogeneously blending
      (1) particles of a sulfur vulcanized, diene-based rubber composition, together with
      (2) a blend of tetrathiodipropionic acid (S4) and trithiodipropionic acid (S3) in a weight ratio thereof in a range of from about 80/20 to about 30/70, and particles of carbon black; or (3) particles of a composite comprised of tetrathiodipropionic acid and trithiodipropionic acid in a weight ratio thereof in a range of from about 80 to about 30/70, and a particulate support therefor selected from at least one of carbon black, precipitated silica, starch, clay, calcium carbonate, calcium silicate and titanium dioxide having a weight ratio of said tetrathiopropionic acid and trithiopropionic acid to said particulate support in a range of from about 1/10 to about 10/1;

wherein about 0.18 to about 10 parts by weight of said tetrathiopropionic acid and trithiopropionic acid are provided per 100 parts by weight of diene-based rubber contained in said sulfur vulcanizable rubber composition, and wherein said particles of sulfur vulcanized rubber composition is of a particle size of less than 420 microns;

(B) mixing about one to about 40 parts by weight of said particulate pre-blend with 100 parts by weight of at least one unvulcanized hydrocarbon diene-based, sulfur vulcanizable rubber to form a rubber composition comprised of said unvulcanized rubber and said pre-blend;

wherein sulfur is mixed with said particulate pre-blend prior to blending said particulate pre-blend with said unvulcanized hydrocarbon diene-based, sulfur vulcanizable rubber.

2. The process of claim 1 wherein said blend of tetrathiodipropionic acid and trithiodipropionic acid is comprised of a weight ratio thereof in a range of from about 80/20 to about 35/65 and wherein said particulate support is carbon black.

3. The process of claim 1 wherein said blend of tetrathiodipropionic acid and trithiodipropionic acid is comprised of a weight ratio thereof in a range of from about 80/20 to about 30/70 wherein said blend contains less than 10 weight percent of dithiodipropionic acid and wherein said particulate support is carbon black.

4. The process of claim 1 wherein about one to about 40 parts by weight of said particulate pre-blend is mixed with sulfur and 100 parts by weight of said unvulcanized hydrocarbon diene-based rubber.

5. A rubber composition prepared by the process of claim 1 wherein said rubber composition is sulfur vulcanized in a suitable mold at a temperature in a range of about 140° C. to about 180° C.

6. A rubber composition prepared by the process of claim 2.

7. A rubber composition prepared by the process of claim 3 wherein said rubber composition is sulfur vulcanized in a suitable mold at a temperature in a range of about 140° C. to about 180° C.

8. A rubber composition prepared by the process of claim 4 wherein said rubber composition is sulfur vulcanized in a suitable mold at a temperature in a range of about 140° C. to about 180° C.

9. An article of manufacture which contains at least one component comprised of a rubber composition prepared according to claim 1.

10. An article of manufacture which contains at least one component comprised of a sulfur vulcanized rubber composition of claim 5.

11. An article of manufacture which contains at least one component comprised of a sulfur vulcanized rubber composition of claim 7.

12. A tire which contains at least one component which contains a rubber composition prepared by the process of claim 1.

13. A tire which contains at least one component of a sulfur vulcanized rubber composition of claim 5.

14. A tire which contains at least one component comprised of a sulfur vulcanized rubber composition of claim 7.

15. A tire having a tread as a rubber composition which contains a rubber composition prepared by the process of claim 1.

16. A tire having a tread of a rubber composition comprised of the sulfur vulcanized rubber composition of claim 5.

17. A tire having a tread of a rubber composition comprised of the sulfur vulcanized rubber composition of claim 6.

18. A tire having a tread of a rubber composition comprised of the sulfur vulcanized rubber composition of claim 7.

19. A tire having a tread of a rubber composition comprised of the sulfur vulcanized rubber composition of claim 8.

* * * * *